United States Patent Office 3,322,797
Patented May 30, 1967

3,322,797
HYDROXY-CONTAINING IMINE COMPOUNDS
Roy T. Holm, Orinda, Calif., assignor to Shell Oil Company, New York, N.Y., a corporation of Delaware
No Drawing. Filed Sept. 22, 1965, Ser. No. 489,377
13 Claims. (Cl. 260—404.5)

This application is a continuation-in-part of my application Ser. No. 50,064, filed Aug. 17, 1960, now abandoned.

This invention relates to new hydroxy-containing imines and to their preparation. More particularly, the invention relates to new hydroxy-containing imines prepared from epoxy compounds and other imines and to the use of the new products, particularly as curing agents for polyepoxides.

Specifically, the invention provides new and particularly useful hydroxy-containing imines prepared by reacting an imine containing at least one amino hydrogen and preferably an imine of the formula

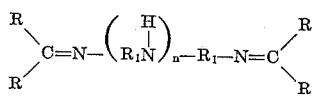

wherein R may be hydrogen or a hydrocarbon radical, $R_1$ is a bivalent hydrocarbon radical and $n$ is an integer of at least one, with a compound containing at least one vic-epoxy group and preferably a glycidyl ether or ester.

The invention further provides a process for utilizing the above described new hydroxy-containing polyimines as curing agents for polyepoxides, and preferably glycidyl ethers of polyhydric phenols, which comprises mixing and reacting the polyepoxide with the above-described hydroxy-containing imine and exposing the resulting mixture to a moist atmosphere. The invention provides the hard insoluble infusible cured products obtained by this process.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have a drawback that greatly limits the industrial use of the polyepoxides. The known mixtures comprising the polyepoxide and curing agent set up rather rapidly, and this is true even though the mixtures are stored in air tight containers away from moisture and air and even though the temperature is maintained quite low. This difficulty necessitates a mixing of the components just before use and a rapid use of the material before cure sets in. Such a procedure places a considerable burden on the individual operators, and in many cases, gives inferior products resulting from inefficient mixing and too rapid operations.

It has recently been found that the above-described difficulties can be overcome by using as a latent curing agent an imine compound and preferably a polyimine such as may be obtained by reacting a ketone or aldehyde with polyamine. These materials are relatively inert when mixed with polyepoxides, but when the mixture is exposed to a moist atmosphere they become highly reactive toward the polyepoxide and the mixture sets up to form a hard cured product.

While the above-described imines have been found to be very promising latent curing agents, their use has given rise to several problems which limit their use in certain applications. It has been found, for example, that the imines when used as curing agents for surface coating materials in some cases cause blushing on the surface and also give the coating a slightly oily feeling. The correction of these difficulties would greatly expand the utilization of the imine curing agents.

It is an object of the invention to provide a new class of latent curing agents for polyepoxides. It is a further object to provide new latent curing agents for polyepoxides that are substantially unreactive with polyepoxides when stored under atmospheres free of moisture, but react in contact with moist atmospheres. It is a further object to provide new latent curing agents that can be used to form surface coatings that can be relatively free of blush. It is a further object to provide latent curing agents which give surface coatings free of blush and an oily feeling. It is an object to provide new process for curing new polyepoxides that is particularly useful for the preparation of surface coatings. These and other objects of the invention will be apparent from the following detailed description thereof.

It has now been discovered that these and other objects may be accomplished by the new products of the invention comprising hydroxy-containing imines obtained by reacting an imine containing at least one amino hydrogen and a compound having at least one vic-epoxy group. It has been found that these hydroxy-containing imines are inactive toward polyepoxides when combined together in the absence of moisture but when the composition is spread out and exposed to moist atmosphere it sets up to form a hard cured film. It has further been found that the cured films are surprisingly free of blush as well as substantially free of an oily feel and thus distinguish themselves from the cured films obtained by the use of the straight imines as curing agents. These particular advantages of the new compounds are demonstrated in the examples at the end of the specification.

The new hydroxy-containing imines are obtained by reacting imines possessing at least one amino hydrogen with compounds containing at least one vic-epoxy group. In this reaction, the amino hydrogen on the imine molecule reacts with the epoxy group to form a substituted hydroxy ethyl group attached to the amino nitrogen. One preferred group of compounds which are obtained by reacting an imine of the following structural formula

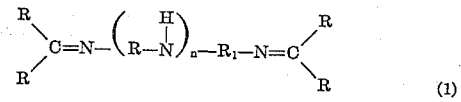

where R is hydrogen or a hydrocarbon or substituted hydrocarbon radical, $R_1$ is a bivalent hydrocarbon or substituted hydrocarbon radical and $n$ is an integer, preferably 1 to 6, with monoepoxy compounds, having the following structural formula

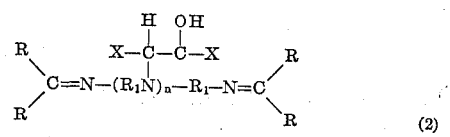

wherein the X radicals are the remaining portions of the epoxy molecule, i.e., when the epoxy group is terminal, one X is hydrogen and the other is the remaining portion of the molecule.

Other preferred compounds which are obtained by reacting the imine of the following formula

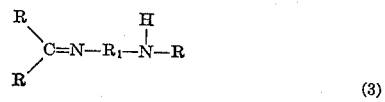

wherein R is hydrogen or a hydrocarbon or substituted hydrocarbon radical, and $R_1$ is a bivalent hydrocarbon or substituted hydrocarbon radical, with monoepoxy compounds, having the following structural formula

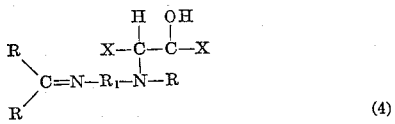
(4)

wherein X is as described above.

Examples of the new hydroxy-substituted imines include, among others, 5,8,11-triaza-2,4,12,14-tetramethyl-8-(2-hydroxy-2-phenyl)ethyl-4,11-pentadecadiene.
4,7,10-triaza-3,11-dimethyl-7-(2-hydroxy-2-phenyl)ethyl-3,10-tridecadiene.
5,8,11-triaza-2,4,12,14-tetramethyl-8-(2-hydroxy-3-allyloxy)propyl-4,11-pentadecadiene.
5,8,11-triaza-3,13-dimethyl-8-(2-hydroxy-3-allyloxy)propyl-4,11-pentadecadiene.
4,7,10-triaza-3,11-dimethyl-7-(2-hydroxycyclohexyl)3,10-tridecadiene.
5,8,11-triaza-3,13-dioctyl-8-(2-hydroxy-3-pentoxy)propyl-4,11-pentadecadiene.
5,8,11-triaza-3,13-didodecyl-8-(2-hydroxy-3-vinyloxy)propyl-4,11-pentadecadiene.
4,7,10-triaza-3,11-dimethyl-7-(2,3-dihydroxy)propyl-3,10-tridecadiene.
5,8,11-triaza-3,13-dimethyl-8-(2-hydroxy)dodecyl-4,11-pentadecadiene.
5,8,11-triaza-3,13-dioctadecyl-8-(2-hydroxy)octadecyl-4,11-pentadecadiene.
5,8,11-triaza-3,13-diisopropyl-8-(2-hydroxy)tetradecyl-4,11-octadecadiene.
5,8,11-triaza-3,13-dimethyl-8-(2-hydroxy-2-cyclohexyl)ethyl-3,10-tridecadiene.
5,8,11-triaza-3,13-dimethyl-8-(2-hydroxy-3-pentachlorophenyloxy)propyl-4,11-pentadecadiene.
4,7,10-triaza-3,11-dimethyl-7-(2-hydroxy-3-chloro)propyl-3,10-tridecadiene.
5,8,11-triaza-3,13-dioctyl-8-(2-hydroxy-3-pentanolyloxy)propyl-4,11-pentadecadiene.
5,8,11-triaza-2,4,12,14-tetramethyl-8-(2-hydroxy-3-octadecanoyloxy)propyl-4,11-pentadecadiene.
5,8,11-triaza-2,4,12,14-tetraoctyl-8-(2-hydroxy-3-benzoyloxy)propyl-4,11-pentadecadiene.
4,7,10-triaza-3,11-dimethyl-7-(2-hydroxy-3-cyclohexyanoyloxy)propyl-3,10-tridecadiene.
5,8,11,14-tetraza-2,4,15,17-tetramethyl-8,11-di[(2-hydroxy-2-phenyl)ethyl]-4,14-octadecadiene.
5,8,11,14-tetraza-2,4,15,17-tetramethyl-8,11-di[(2-hydroxy-3-allyloxy)propyl]-4,14-octadecadiene.
5,8,11,14-tetraza-2,4,15,17-tetramethyl-8,11-di[(2-hydroxy-3-phenyloxy)propyl]-4,14-octadecadiene.
5,8-diaza-4-methyl-8-di[(2-hydroxy-2-phenyl)ethyl]-4-octene.
5,8,11-traza-2,4,12,14-tetramethyl-8-(2-hydroxy-3-glycidyloxy)propyl-4,11-pentadecadiene.
4,7,10-triaza-3,11-dimethyl-7-(2-hydroxy-2-epoxycyclohexyl ethyl)-3,10-tridecadiene.
5,8,11-triaza-2,4,12,14-tetramethyl-8-(2-hydroxyethyl)4,11-pentadecadiene.
5,8,11-triaza-2,4,12,14-tetramethyl-8-(2-hydroxy-3-hydroxyethoxy)propyl-4,11-pentadecadiene.
5,8,11-triaza-2,4,12,14-tetramethyl-8-(2-hydroxy-3-hydroxypropoxy)propyl-4,11-pentadecadiene.
5,10,15-triaza-10(2-hydroxy-3-hydroxypropoxy)propyl-4,14-octadecadiene.
3,12,18-triaza-12(2-hydroxy-3-propoxy)propyl-2,17-eicosadiene.

Preferred hydroxy-substituted imines of the present invention include those of Formula 2 noted above wherein R is hydrogen or a hydrocarbon radical, and preferably an aliphatic, cycloaliphatic hydrocarbon radical containing 1 to 12 carbon atoms, $R_1$ is a bivalent hydrocarbon radical, and preferably a bivalent aliphatic radical containing 1 to 10 carbon atoms, $n$ is 1 to 5, one X is hydrogen and the other X is a hydrocarbon radical, ether or ester substituted hydrocarbon radical or a halogenated and especially a polychlorinated hydrocarbon radical, which radicals preferably contain 1 to 25 carbon atoms, and especially 1 to 12 carbon atoms.

Coming under special consideration are those of the formula

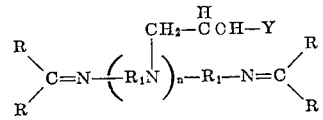

wherein $R_1$ is a bivalent hydrocarbon radical, Y is a member of the group consisting of hydrogen, OH, hydrocarbon radicals, $-(CH_2)_xOR_2$ radicals wherein $R_2$ is a hydrocarbon, halo-substituted hydrocarbon, hydroxyl-substituted hydrocarbon or an epoxy-substituted hydrocarbon radical, and $x$ is 0 to 6, $$-(CH_2)_xOR_1OR_2$$

wherein $R_2$ and $x$ are as described above and $R_1$ is as described below,

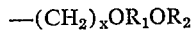

wherein $R_2$ and $x$ are as described above,

wherein $R_2$ and $x$ are as described above,

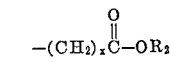

wherein $m$ is an integer of 1 to 3, $R_2$ and $x$ are as described above and $R_3$ is a polyvalent hydrocarbon radical, and $n$ is an integer of 1 to 6.

Examples of these compounds are as follows—wherein Y is hydrogen (1)
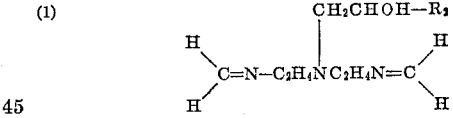

wherein $R_2$ is hydrogen, $-CH_3$, $-C_2H_5$, $C_5H_{11}$, $$-CH_2-CH=CH_2$$

$-CH=CH_2$, $-C_6H_{11}$, phenyl, methylphenyl, dichlorophenyl, cyclohexenyl and naphthyl, (2)
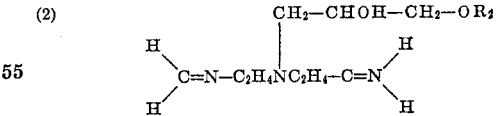

wherein $R_2$ is $-CH_3$, $-C_2H_5$, $-C_5H_{11}$, $C_{10}H_{21}$, cyclohexyl, cyclohexenyl, allyl, phenyl, chloroallyl, chlorophenyl, naphthyl, allylphenyl, 2,2-dimethylbutyl, and $$-CH_2-C\equiv CH, -C_6H_{11}OH$$

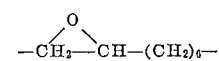

dibromo-substituted penty, hydroxy-substituted cyclohexyl, (g)
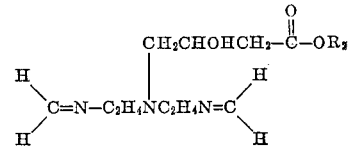

wherein $R_2$ is —$C_4H_9$, —$C_2H_5$, —$C_3H_7$, $C_{20}H_{41}$, —$C_{16}H_{33}$ methyl cyclopentyl, phenyl, butylphenyl, 3,4-dibutylpentyl,

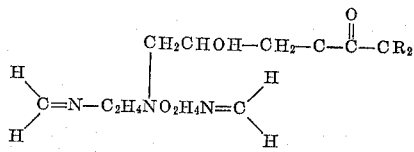

wherein $R_2$ is —$CH_3$, —$C_3H_7$, allyl, pentenyl, cyclohexyl, methyl cyclopentyl, phenyl butylphenyl, 3,4-dibutylpentyl, (5)

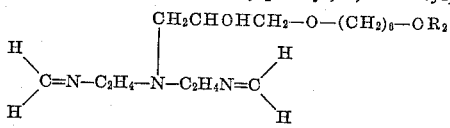

wherein $R_2$ is —$C_3H_7$, —$C_8H_{17}$, —$C_8H_{13}$, pentenyl, hexenyl, octenyl, octadecenyl, cyclohexyl, phenyl, chloronaphthyl, 3,5-diethylhexyl, (6)

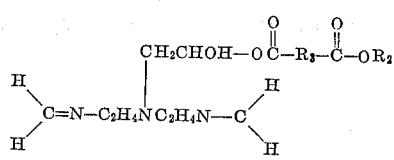

wherein $R_2$ is —$C_3H_7$, —$C_8H_{17}$, $C_6H_{13}$, pentenyl, hexenyl, octenyl, octadecenyl, cyclohexyl, phenyl, chloronaphthyl, 3,5-diethylhexyl and $R_3$ is —$C_2H_5$—,

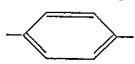

—$C_6H_{10}$—, —$(CH_2)_6$—, —$(CH_2)_{10}$—, (7)

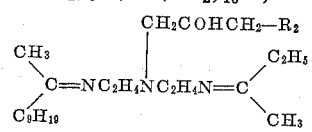

wherein $R_2$ is as described in (1) above, (8)

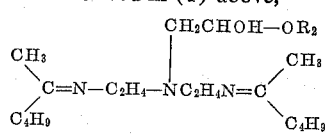

wherein $R_2$ is as described under (2) above, (9)

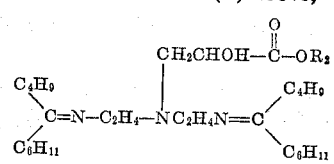

wherein $R_2$ is as described under (3) above, (10)

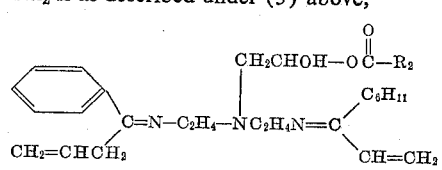

wherein $R_2$ is as described in (4) above, (11)

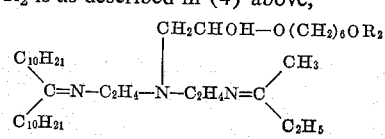

wherein $R_2$ is as described in (5) above, (12)

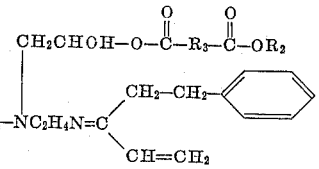

wherein $R_3$ and $R_2$ are as described in (6) above, and compounds of Formulae 1 to 12 wherein the $$=NC_2H_4\overset{|}{N}C_2H_4N=$$

is replaced by each of the following $$=N-C_6H_4-\overset{|}{N}C_6H_4N=$$

$$=N-C_6H_{10}-\overset{|}{N}C_6H_{10}N=$$

$$=N-CH_2=CH_2-CH_2-\overset{|}{N}-CH_2=CH_2-CH_2-N=$$

$$=N(CH_2)_5\overset{|}{N}-(CH_2)_5N=$$

$$=N(CH_2)_8\overset{|}{N}-(CH_2)_8N=$$

$$=N(CH_2)_{12}\overset{|}{N}-(CH_2)_{10}N=$$

The imines used in making the above-described new compounds of the invention are those compounds possessing at least one >C=N— group, and at least one hydrogen attached to amino nitrogen, i.e., at least one $$\overset{H}{\underset{}{-N-}}$$

group. These compounds may be aliphatic, cycloaliphatic, aromatic or heterocyclic. The imine group may be in an open chain or may be contained in a cyclic structure. The compounds may be saturated or unsaturated and substituted with components such as chlorine, ether radicals, ester radicals and the like.

Examples of the imines include, among others, 4,7,10-triaza-3,10-tridecadiene
3,11-dimethyl-4,7,10-triaza-3,10-tridecadiene
5,8,12-triaza-4,12-heptadecadiene
4,13-diisopropyl-5,8,12-triaza-4,12-heptadecadiene
3,11-dicyclohexenyl-4,7,10-triaza-3,10-tridecadiene
7,10,13-triaza-6,13-nonadecadiene
3,11-diallyl-4,7,10-triaza-3,10-tridecadiene
4,13-dicyclopentyl-5,8,12-triaza-4,12-heptadecadiene
N,N′-di(allylidene)-1,4-benzenediamine
N-(2-propylidene)-1,5-pentanediamine
N-(1-propylidene)-1,6-hexanediamine
N,N′-di(2-propylidene)-3-aza-1,5-pentanediamine
N-(2-butylidene)-1,4-cyclohexanediamine
N,N′-di(2-butylidene)-3,6-aza-1,8-octanediamine.

The above-described imines may be prepared by a variety of methods. They are preferably prepared by reacting a ketone or aldehyde with a polyamine. Examples of ketones that may be used for this purpose include, among others, methyl ethyl ketone, methyl isobutyl ketone, dimethyl ketone, diethyl ketone, dibutyl ketone, diisobutyl ketone, methyl isopropyl ketone, ethyl butyl ketone, methyl octyl ketone, methyl phenyl ketone, methyl cyclohexyl ketone, dioctyl ketone, allyl methyl ketone, beta-chloroallyl methyl ketone, methyl cyclohexenyl ketone, methoxymethyl butyl ketone, 1,20-eicosanedione, 1,18-octadecanedione, and the like.

Preferred ketones to be used are the aliphatic, cycloaliphatic and aromatic ketones containing 3 to 25 and still more preferably 3 to 12 carbon atoms and corresponding diketones having the keto groups separated by at least 2 and preferably at least 4 carbon atoms.

Examples of aldehydes include, among others, acetaldehyde, propionaldehyde, chloropropionaldehyde, butyraldehyde, isobutyraldehyde, valeroaldehyde, caproic aldehyde, heptoic aldehyde, methacrolein, nicotinaldehyde, cinchoninaldehyde, 2-pyrancarboxyaldehyde, tetrahydropyran-2-carboxyaldehyde, 2-furaldehyde, crotonaldehyde, acrolein, benzaldehyde, 1-naphthaldehyde, durene dialdehyde, glutaraldehyde, 1-cyclohexene-1-carboxyaldehyde, 1-cyclopentene-1-carboxyaldehyde and 2,4-heptadiene-1-carboxyaldehyde. Preferred aldehydes to be used include the aliphatic, cycloaliphatic and aromatic mono- and dialdehydes containing from 2 to 20 carbon atoms and still more preferably from 2 to 12 carbon atoms.

Examples of amines that may be used in reaction with the above-described ketones and aldehydes include, among others, xylylene diamine, p-phenylene diamine, diaminodiphenylsulfone, diaminodiphenylmethane, triaminobenzene, 2,3-diaminotoluene, 2,2'-diaminodiphenyl, 1,3 - diamino-4-isopropylbenzene, 1,3-diamino-4,5 - diethylbenzene, diaminostilbene, ethylene diamine, diethylene triamine, triethylene tetramine, tetraethylene pentamine, diaminopyridine, N,N-diethyl-1,3 - propanediamine, butylamine, octylamine, decylamine, benzylamine, aniline, adducts of polyepoxides and polyamines which still contain amine hydrogen, such as adducts of diethylene triamine and glycidyl ethers of polyhydric phenols, or adducts of monoepoxides and polyamines which still contain amine hydrogen, such as adducts of diethylene triamine and ethylene oxide, or adducts of polyamines and unsaturated nitriles, as acrylonitrile, and the like. Preferred amines to be used include the primary aliphatic, cycloaliphatic and aromatic monoamines containing up to 20 carbon atoms and the aliphatic, cycloaliphatic and aromatic amines containing at least one primary amino group and up to 20 carbon atoms.

The imines may be prepared by methods disclosed in U.S. 2,533,723, U.S. 2,692,284, U.S. 2,765,340 and U.S. 2,692,283.

Preparation of a polyimine from diethylene triamine and methyl isobutyl ketone is illustrated by the following:

PREPARATION OF 2,4,12,14-TETRAMETHYL-5,8,11-TRIAZA-4,11-PENTADECADIENE 3 moles of methyl isobutyl ketone was combined with 1 mole diethylene triamine. The mixture was refluxed under phase separator. The water which separated was removed. When the theoretical amount of water had been recovered, the reaction was stopped. The mixture was then distilled to yield 2,4,12,14-tetramethyl-5,8,11-triaza-4,11-pentadecadiene a liquid having a boiling point of 130° C. (1 mm./Hg).

Found: C, 71.7; H, 12.5; N, 15.9. Theory: C, 71.8; H, 12.4; N, 15.7.

The new compounds of the present invention are obtained by reacting the above-described imine compounds with compounds possessing at least one vic-epoxy group, i.e., a compound having at least one

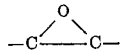

group. These compounds may be aliphatic, cycloaliphatic, aromatic, or heterocyclic and may be saturated or unsaturated. They may also be substituted with substituents which do not react with amino groups or epoxy groups, i.e., ether and ester radicals, halogen atoms. Examples of monoepoxides include, among others, styrene oxide, pheny glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxypropionate, butyl 1,2-epoxypropionate, and the like.

Preferred monoepoxides to be used include the monoepoxy-substituted hydrocarbons, such as, for example, the alkylene oxides containing up to 12 carbon atoms, the epoxy-substituted cycloaliphatic and aromatic hydrocarbons as epoxy cyclohexane, epoxypropylbenzene, and the like; the monoepoxy substituted alkyl ethers of hydrocarbon monohydric alcohols or phenols, such as, for example, the glycidyl ethers of aliphatic, cycloaliphatic and aromatic hydrocarbon alcohols containing up to 12 carbon atoms; the monoepoxy-substituted alkyl esters of hydrocarbon monocarboxylic acids, such as, for example, the glycidyl esters of aliphatic, cycloaliphatic and aromatic hydrocarbon acids, as glycidyl acrylate, glycidyl caprolate, glycidyl benzoate, and the like; the monoepoxy-substituted alkyl esters of hydrocarbon polycarboxylic acids wherein the other carboxy group or groups are esterified with alkanols, such as, for example, glycidyl esters of phthalic acid, maleic acid, isophthalic acid, succinic acid and the like, wherein each contains up to 15 carbon atoms; alkyl and alkenyl esters of epoxy-substituted monocarboxylic acids, such as esters of 1,2-epoxy-propionic acid, epoxy butyric acid and epoxy pentanoic acid; epoxyalkyl ethers of polyhydric alcohols wherein the other OH groups are esterified or etherified with hydrocarbon acids or alcohols, such as, for example, monoglycidyl ethers of aliphatic, cycloaliphatic polyhydric alcohols and polyhydric phenols, each containing no more than 15 carbon atoms; and monoesters of polyhydric alcohols and epoxy monocarboxylic acids wherein the other OH groups are esterified or etherified with hydrocarbon acids or alcohols, each containing no more than 15 carbon atoms.

Coming under special consideration, particularly because of the superior properties of the resulting hydroxy-substituted amines as curing agents, are those monoepoxides which contain halogen atoms, and especially a plurality of chlorine atoms, such as epichlorohydrin, pentachlorophenyl glycidyl ether, hexachlorocyclohexyl glycidyl ether and the like.

Especially preferred are monoepoxides of the formula

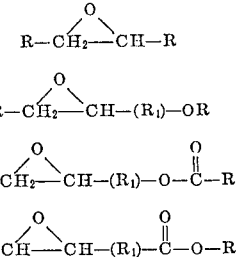

wherein R is hydrogen, a hydrocarbon or halogenated hydrocarbon radical and $R_1$ is a bivalent hydrocarbon or halogenated bivalent hydrocarbon radical, preferably containing 1 to 12 carbon atoms.

Examples of the polyepoxides to be used in making the new hydroxy-substituted imines include those containing more than one epoxy group, such as glycidyl ethers of polyhydric alcohols and polyhydric phenols, glycidyl esters of polycarboxylic acids, epoxidized polyethylenically unsaturated hydrocarbons, esters, ethers, amides and the like. Examples of such polyepoxides may be found hereinbelow in the discussion of materials that may be cured with the new hydroxy-substituted imines.

The new compounds are prepared by combining any one or more of the above-described imines with one or more of the above-described epoxy compounds. In most cases, the reaction takes place by combining the components together and it is not necessary to apply heat. In some cases, however, the reaction can be speeded by the use of heat. Preferred temperatures range from 50° C. to 200° C. The reaction is usually effected under atmospheric pressure although subatmospheric pressure may be used with high boiling epoxides or imines, and superatmospheric pressure may also be employed as needed.

The amount of the two components to be employed in preparing the new hydroxy-substituted imines may vary over a wide range. In general, it is preferred to combine the epoxide and the imine in equivalent amounts, i.e., in an amount sufficient to furnish 1 epoxy group per amine hydrogen to be reacted. In general, equivalent ratios may vary from about 1.5:1 to about 1:1.5. When employing a polyepoxide with a compound possessing a single amino hydrogen, or alternatively, when employing a monepoxide with a compound possessing a plurality of amino hydrogen, it is sometimes desirable to employ the polyfunctional material in excess, e.g., an excess of .5 to 3 equivalents, so as to form products still possessing active epoxy groups or amino hydrogen. When employing a polyepoxide with a compound possessing a plurality of amino hydrogen, there is a possibility of building up long chain polymers and the proportions should be employed accordingly. In using both polyfunctional materials, it is preferred to combine the materials in an equivalent ratio of 1:2 to 2:1.

As the imines are sensitive to moisture, the above reaction should, of course, be conducted under anhydrous conditions, and the resulting product stored in the absence of moisture.

If either one or more of the reactants is a viscous liquid or solid, or the mixture is too thick for efficient operation, it may be desirable to effect the reaction in an inert solvent of the reactants and/or products, such as, for example, dioxane, diethyl ether and the like.

The new compounds of the invention will vary from fluid liquids to solids. They are soluble in organic solvents, such as dioxane, and are compatible with oils, resins and the like. They are also permanently fusible, i.e., not convertible on heat to an insoluble infusible mass.

The new compounds of the invention are further characterized by the fact that they react on contact with moisture to form reactive polyamines. It is this characteristic that makes them particularly suited for use as curing agents for polyepoxides. The polyepoxides may be cured with the new compounds by merely mixing the two components together and then exposing the resulting mixture to a moist atmosphere. If one wishes to avoid a rapid cure or to avoid the cure all together, the mixture of hydroxy substituted amine and the polyepoxide may be stored together in a moisture free container.

The polyepoxide and imines can be combined in a variety of proportions. In most cases, it is preferred to combine the polyepoxide with at least .6 equivalents of the imine. As used herein in relation to the proportion of polyepoxide and imine, "equivalent" means the amount of the imine which furnishes ½ of a C=N group per epoxy group. Preferably the components are combined in a chemical equivalent ratio varying from .6:1 to 1.5:1.

In executing the process of the invention, it is sometimes desirable to have the polyepoxide in a mobile liquid condition when the imine is added so as to facilitate thorough mixing. The polyepoxides as described below are generally viscous to solid materials at ordinary temperature. With those that are liquid, but too viscous for readily mixing, they are either heated to reduce the viscosity or have a liquid solvent added thereto in order to provide fluidity. Normally solid members are likewise either melted or mixed with a liquid solvent. Various solvents are suitable for achieving fluidity of the polyepoxides. These may be volatile solvents which escape from the polyether compositions containing the imine by evaporation before or during the curing such as ketones like acetone, methyl ethyl ketone, methyl isobutyl ketone, isophorone, etc., esters such as ethyl acetate, butyl acetate. Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, ispropyl of n-butyl alcohol. Solvents which remain in the cured compositions may also be used, such as diethylphthalate, or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The imines may also be used in combination with other curing agents, such as aliphatic polyamines, anhydrides, BF$_3$-amine complexes and polythiols, particularly when long storage periods are not required.

The cure of the above-described mixture is effected by exposing the mixture to moisture, and preferably a moist atmosphere. The rage of cure up to a certain point will increase with the increased moisture content. In most cases, it is preferred to employ an atmosphere having at least 20% relative humidity, and still more preferably a relative humidity of 30% to 90%.

The temperature employed during the cure may vary over a wide range. Satisfactory rates are obtained at room temperature or lower, but generally preferred to apply some heat to accelerate the cure. Temperatures ranging from about 15° C. to about 150° C. have proved very satisfactory.

An important use of the process of the invention is in the preparation of coating and surfacing compositions. In this application, the polyepoxide, special latent curing agent and other desired resinous materials, plasticizers, flexibilizers, stabilizers and the like are combined together and the mixture applied to the desired surface, such as concrete, asphalt, metal, plaster, stone, wood, and the like, by conventional procedure, such as brushing, dipping, spraying and the like, and then the coating is allowed to remain in a moist atmosphere until it has set hard. As noted above, heat may be applied to accelerate the cure.

Another important application of the process of the invention is in the production of laminates or resinous articles reinforced with fibrous textiles. Although it is generally preferred to utilize glass cloth for this purpose, any of the other suitable materials in sheet form may be employed such as glass matting, paper, asbestos paper, mica flakes, cotton bats, duck muslin, canvas, and the like.

In preparing the laminate, the sheets of fibrous material are first impregnated with the mixture of polyepoxide, latent curing agent. This is accomplished by dissolving the material in a solvent such as acetone and the sheets then impregnated with this solution and exposed to moisture to effect a partial cure of the material. The resulting sheets are then superimposed and cured together under heat and pressure according to conventional techniques.

The polyepoxides to be used in the process of the invention include those organic compounds containing a plurality of epoxy groups, i.e.,

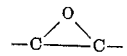

groups. These compounds may be saturated or unsaturated, aliphatic, cycloaliphatic, aromatic or heterocyclic and may be substituted if desired with substitutents, such as chlorine atoms, hydroxyl-groups, ether radicals, and the like. They may also be monomeric or polymeric.

For clarity, many of the polyepoxides and particularly those of the polymeric type have been defined in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides and/or contain macromolecules of somewhat different molecular weight so that epoxy equivalent values may be quite low and contain fractional values.

The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

A group of polyepoxides which are not specifically illustrated in the above patent but are of particular value in the process of the invention are the glycidyl ethers of novalac resins which resins are obtained by condensing an aldehyde with a polyhydric phenol. A typical member of this class is the epoxy resin from formaldehyde 2,2-bis-(5-hydroxyphenyl) propane novalac resin which contains as predominant constituent the substance represented by the formula

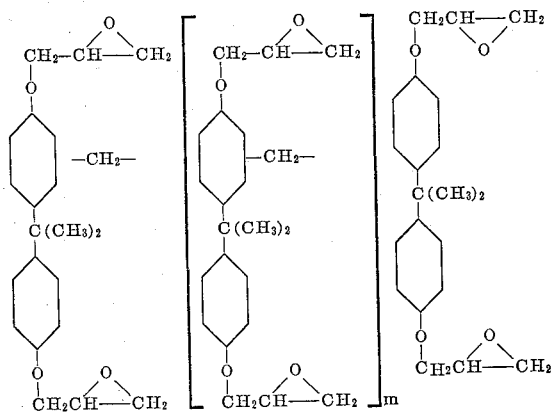

Another group of preferred polyepoxides comprise the glycidyl ethers of alpha, alpha, omega, omega-tetrakis (hydroxyaryl) alkanes as described and claims in Schwarzer, Ser. No. 466,208, filed Nov. 1, 1954, now U.S. Patent No. 2,806,016.

Other examples include epoxidized esters of polyethylenically unsaturated monocarboxylic acids, such as epoxidized linseed, soybean, perilla, oiticica, tung, walnut and dehydrated castor oil, methyllinoleate, butyl linoleate, ethyl 9,12-octadecadienoate, butyl 9,12,15-octadecatrienoate, butyl oleostearate, monoglycerides of tung oil fatty acids, monoglycerides of soybean oil, sunflower, rapeseed, hempseed, sardine, cottonseed, and the like.

Another group of polyepoxides useful in the process of the invention include the epoxidized esters of unsaturated monohydric alcohols and polycarboxylic acids, such as, for example, di(2,3-epoxybutyl)adipate, di(2,3-epoxybutyl)oxalate, di(2,3-epoxyheptyl) succinate, di (2,3-epoxybutyl) maleate, di(2,3-epoxyoctyl) pimelate, di(2,3-epoxypropyl) phthalate, di(2,3-epoxycyclohexyl) adipate, di(2,3-epoxypentyl) thiodipropionate, di(5,6-epoxytetradecyl) diphenyldicarboxylate, di(3,4 - epoxyheptyl) sulfonyldibutyrate, tri(2,3-epoxypropyl) 1,2,4-butanetricarboxylate, di(5,6 - epoxypentadecyl)tartarate, di(4,5-epoxytradecyl) maleate, di(3,4-epoxybutyl) citrate, and di(4,5-epoxyoctadecyl) malonate. Preferred members of this group comprise the glycidyl esters, such as the glycidyl esters of the dicarboxylic acids preferred containing from 2 to 18 carbon atoms, such as diglycidyl phthalate, diglycidyl maleate, diglycidyl adipate, diglycidyl sebacate, diglycidyl cyclohexanedicarboxylate and the like.

Another group of the polyepoxides include the epoxidized esters of unsaturated alcohols and unsaturated carboxylic acids, such as 2,3-epoxybutyl, 3,4-epoxypentanoate, 3,4 - epoxyhexyl, 3,4 - epoxypentanoate, 3,4-epoxycyclohexyl 3,4 - epoxycyclohexanoate, 3,4 - epoxycyclohexyl, 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate, dibutyl 7,8,11, 12 - diepoxyoctadecanedioate, dioctyl 10,11-diethyl-8,9, 12,13 - diepoxy-eiconsanedioate, dihexyl - 6,7,10,11 - diepoxyhexadecanedioate, didecyl 9 - epoxy-ethyl - 10,11-epoxyoctadecanedioate, dibutyl 3 - butyl - 3,4,5,6 - diepoxycyclohexene - 1,2 - dicarboxylate, dibenzyl 1,2,4,5-diepoxycyclohexane - 1,2 - dicarboxylate and diethyl 5,6, 10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol and 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

To illustrate the manner in which the invention may be carried out the following examples are given. It is to be understood, however, that the examples are for the purpose of illustration and the invention is not to be regarded as limited to any of the specific materials or conditions recited therein; unless otherwise indicated parts are parts by weight.

Polyether A referred to herein is the Polyether A described in U.S. 2,633,458 referred to above.

*Example I*

This example illustrates the preparation and some of the properties of a hydroxy imine from styrene oxide and a ketimine obtained from methyl isobutyl ketone and diethylene triamine.

26 grams of the ketimine obtained from methyl isobutyl ketone and diethylene triamine (2,4,12,14-tetramethyl-5,8,11-triaza-4,11-pentadecadiene) was combined with 12 parts of styrene oxide and 0.12 part of phenol and mixture sealed in a glass reactor and left overnight at room temperature. The resulting product was a liquid having the following structure:

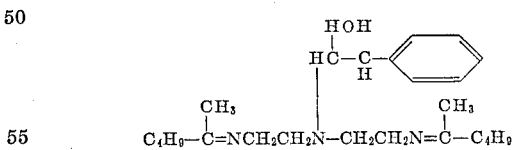

1 equivalent of the above compound was combined with 1 equivalent Polyether A and the mixture kept in a dry closed vessel for several days. When the vessel was opened there was no indication of any cure taking place.

The mixture was then spread out on glass panels and cured at 25° C. and 50% humidity. The resulting product was a hard clear film free of blush and free of oily feeling.

A coating was also prepared from Polyether A and the plain imine prepared from the ketone and diethylene triamine. While the coating cured in a moist atmosphere, the film had blushed and had an oily feel.

*Example II*

Example I was repeated with the exception that the ketimine employed was a reaction product of diethylene triamine and methyl ethyl ketone. An adduct having related properties was obtained.

Example III

This example illustrates the preparation of a hydroxy imine from allyl glycidyl ether and a ketimine of methyl isobutyl ketone and diethylene triamine.

26 parts of the above-described ketimine was combined with 11.4 parts of allyl glycidyl ether and 0.11 part of phenol. This mixture was stirred and kept overnight at room temperature. The resulting product was a fluid hydroxy-imine having a viscosity of 72 centipoises at 25° C.

The above-described adduct was combined with Polyether A in equivalent amounts and the mixture stored in a moisture free container for several days. At the end of that time there was no indication of cure taking place. This mixture was then spread out as a film on glass plates. The film cured at 25° C. and 50% humidity to form a hard insoluble coating free of blush and oily feeling.

Example IV

Example III was repeated with the exception that the ketimine employed was a reaction product of di(4-aminophenyl) amine and methyl isobutyl ketone. A hydroxy imine having related products is obtained.

Example V

This example illustrates the preparation of a hydroxy imine from cyclohexene oxide and ketimine from methyl isobutyl ketone and diethylene triamine.

26 parts of the above-described ketimine was combined with 9.8 parts of cyclohexene oxide and 0.1 part of phenol. The mixture was stirred and allowed to stand at room temperature overnight. The resulting product was a fluid hydroxy-imine having the viscosity of 10 centipoises at 25° C.

24 parts of the imine was mixed with 50 parts of Polyether A and the mixture spread out as a film on glass plates. The film cured at 25° C. and 50% humidity to form a hard clear film.

Example VI

Example V was repeated with the exception that the ketimine employed was a reaction product of methyl ethyl ketone and diethylene triamine.

Example VII

This example illustrates the preparation and properties of a hydroxy imine from glycidol and the ketimine from methyl ethyl ketone and diethylene triamine.

26 parts of the above-described ketimine are combined with 7.5 parts of glycidol and 0.07 part of phenol. This mixture is stirred and kept at room temperature overnight. The resulting product is a liquid hydroxy imine.

1 equivalent of the imine is mixed with 1 equivalent of Polyether A and the mixture spread on glass panels. The films cure at 25° C. and 50% humidity to form a hard cured film free of blush and oily feeling.

Example VIII

Example VII is repeated with the exception that the ketimine was a reaction product of tetramethylene diamine and methyl isobutyl ketone. A hydroxy imine having related properties was obtained.

Example IX

This example illustrates the preparation of a hydroxy imine from o-allyl phenyl glycidyl ether and a ketimine from methyl isobutyl ketone and diethylene triamine.

26 parts of the above-described ketimine was combined with 19.9 parts of o-allyl phenyl glycidyl ether and 0.19 part of phenol. The mixture was stirred and allowed to stand at room temperature overnight. The resulting product was a fluid hydroxy imine having a viscosity of 329 centipoises at 25° C.

1 equivalent of the above-described hydroxyimine was combined with 1 equivalent of Polyether A and the mixture spread as thin film on glass panels. The film dried at 25° C. and 50% humidity to form a hard clear film free of blush and oily appearance.

Example X

Example IX was repeated with the exception that the polyimine employed was a reaction product of diethylene triamine and methyl levulinate.

Example XI 26 parts of ketimine from methyl isobutyl ketone and diethylene triamine was combined with 12.8 parts of octylene oxide and 0.13 part of phenol. The resulting product was a fluid hydroxy imine having a viscosity of 6.5 centipoises at 25° C.

Example XII

Example XI was repeated with the exception that the ketimine employed was a reaction product of methyl ethyl ketone and triethylene tetramine. A hydroxy imine having related properties was retained.

Example XIII 26 parts of a ketimine from methyl isobutyl ketone and diethylene triamine was combined with 15.2 parts of d-limonene monoepoxide and 0.15 part of phenol. This mixture was stirred and kept at room temperature overnight. The resulting product was a liquid hydroxy imine having a viscosity of 14 centipoises at 25° C.

27.5 parts of the above-described hydroxy imine was mixed with 50 parts of Polyether A and the mixture spread on glass panels and cured at 25° C. and 50% humidity. The resulting films were very hard and clear and free of blush and oily feeling.

Example XIV 26 parts of the ketimine from methyl isobutyl ketone and diethylene triamine was combined with 12.4 parts of vinylcyclohexene monoepoxide and 0.12 part of phenol. This mixture was stirred and allowed to stand at room temperature. The resulting product was a fluid hydroxy imine having a viscosity of 17 centipoises at 25° C.

1 equivalent of the imine was mixed with 1 equivalent of Polyether A and the mixture placed on glass panels and cured at 25° C. and 50% humidity. The resulting product was a hard clear film.

Example XV 26 parts of the ketimine from ethyl isobutyl ketone and diethylene triamine was combined with 7.2 parts of 1,2-butylene oxide and 0.07 part of phenol. This mixture was stirred and allowed to stand at room temperature overnight. The resulting product was a fluid hydroxy imine having a viscosity of 32 centipoises at 25° C.

Example XVI 26.7 parts of the ketimine from methyl isobutyl ketone and diethylene triamine was combined with 38.5 parts of a diglycidyl ester of dimerized linoleic acid and 0.4 part of phenol. This mixture was stirred and allowed to stand at room temperature overnight. The resulting product was a fluid hydroxy imine.

Equivalent amounts of the above-described adduct and Polyether A were mixed and the mixture spread out as a thin film on glass panels. The films cured at 25° C. and 50% humidity to form a hard clear coating.

Example XVII

Example XVI was repeated with the exception that the ketimine employed was a reaction product of methyl ethyl ketone and di(4-amino-phenyl) amine.

Example XVIII 20 parts of Polyether A described above and 53 parts of a ketimine from methyl isobutyl ketone and diethylene triamine were mixed together and kept 24 hours at room temperature. The resulting product was a liquid hydroxy imine having a viscosity of 1210 cps. at 25° C.

62.5 parts of the above-described adduct was combined with 100 parts of Polyether A and the mixture spread as a film on glass panels to form a 5 mil coating. The film cured at 25° C., 50% humidity to form a hard clear film.

*Example XIX*

Example XVIII was repeated with the exception that 288 parts of Polyether A was combined with 400 parts of ketimine. This mixture was stirred and heated at 100° for two hours. The resulting product was a viscous hydroxy imine.

A coating was prepared by combining 62.5 parts of the above-described adduct and 100 parts of Polyether A and 5 parts of a urea-formaldehyde resin. This composition was spread on glass panels and cured overnight at 25° C. and 50% humidity to form hard clear coatings.

*Example XX*

77 parts of a glycidyl polyether of 2,2-bis(4-hydroxyphenyl) propane was combined with 31 parts of a ketimine obtained from triethylene tetraamine and methyl isobutyl ketone. The mixture was stirred and heated for two hours at 100° C. The resulting product was a solid hydroxy imine.

62.5 parts of the above-described hydroxy imine was combined with Polyether A and the resulting mixture was spread out on tin panels and cured at 25° C. and 50% humidity. The resulting product was a hard clear coating.

*Example XXI*

Example XX was repeated with the exception that the 31 parts of the ketimine was combined with 57.7 parts of Polyether A. The resulting product was a soft soluble hydroxy imine.

Equivalent amounts of the imine and Polyether A were mixed and spread on glass panels and cured at 25° C., 50% humidity. The resulting product was a hard clear film.

*Example XXII*

13.5 parts of diglycidyl ether was combined with 26.7 parts of a ketimine of methyl isobutyl ketone and diethylene triamine. The resulting mixture heated for two hours at 80° C. and then two hours at 125° C. The resulting product was a fluid hydroxy imine.

71 parts of the above-described adduct was combined with 100 parts of Polyether A and the mixture spread on glass panels and cured at 125° C. and 50% humidity. The resulting product was a hard clear film.

*Example XXIII*

Example XXII was repeated with the exception that 53.4 parts of the ketimine was combined with 13.5 parts of the diglycidyl ether. The resulting product was a fluid hydroxy imine.

44.5 parts of the above-described adduct was combined with 100 parts of Polyether A and the mixture spread on glass panels and cured at 25° C. and 50% humidity. The resulting product was a hard clear film free of blush and oily feel.

*Example XXIV*

32 parts of pentachlorophenyl glycidyl ether was combined with 26.7 parts of the imine of methyl isobutyl ketone and diethylene triamine. Toluene was added to make the mixture more fluid. The mixture was kept at 100° C. for several hours and then distilled to remove the toluene. The resulting product was a viscous hydroxy imine. Analysis of the compound was as follows:

Calc. $C_{25}H_{38}O_2N_3Cl_5$. Found: C, 50.0; H, 6.4; N, 7.09; Cl, 30.0. Theory: C, 50.0; H, 6.5; N, 7.1; Cl, 30.0.

62.5 parts of the above adduct was combined with 100 parts of Polyether A and the mixture spread on glass panels. The coatings were cured at 25° C. and 50% humidity to form hard cured coatings free of blush and oily feel.

*Example XXV*

26.7 parts of a ketimine obtained from methyl isobutyl ketone and diethylene triamine was combined with 22 parts of a mixture of glycidyl caprylate and glycidyl caprate and 0.2 part of phenol. This mixture was allowed to stand at room temperature for 24 hours. The resulting product was a hydroxy imine having a viscosity of 414 centipoises at 25° C.

31.5 parts of the above-described imine was combined with 50 parts of Polyether A and the mixture spread out on glass panels. The mixture cured at 25° C. and 50% humidity to form a hard clear coating free of blush and oil feel.

*Example XXVI*

Example XXV was repeated with the exception that the glycidyl caprylate was replaced with glycidyl tallate. A hydroxy imine having related properties was obtained.

*Example XXVII*

Example XXV was repeated with the exception that a glycidyl caprylate was replaced by a glycidyl ester of isophthalic acid. Hydroxy imines having related properties was obtained.

*Example XXVIII*

Example XXV was repeated with the exception that the glycidyl caprylate was replaced by a glycidyl ester of orthophthalic acid. A hydroxy imine having related properties was obtained.

*Example XXIX*

Example XVIII was repeated with the exception that the glycidyl ether was glycidol. Hydroxy imines having related properties were obtained.

*Example XXX*

Example I was repeated with the exception that the monoepoxide employed was butyl glycidyl ether. Products having related properties were obtained.

*Example XXXI*

Example I was repeated with the exception that the monoepoxide employed was phenyl glycidyl ether. Products having related properties were obtained.

*Example XXXII*

Examples I to X were repeated with the exception that the ketimine employed was one obtained by reacting methyl ethyl ketone with 3,3-diamino dipropyl amine. Adducts having related properties are obtained.

Products having related properties can be obtained by replacing the epoxy compounds in the reaction with the imines with epithio and polyepithio compounds, acrylonitrile, thioisocyanates, isocyanates, phosgene and other acid chlorides.

*Example XXXIII*

Compounds having the structure as shown in group (1) above are obtained by reacting the ketimine from diethylene triamine and formaldehyde with each of the following: propylene oxide, butylene oxide, heptene oxide, 1,2-epoxy-4-pentene, butadiene monoxide, octylene oxide, styrene oxide, methyl styrene oxide, dichlorostyrene oxide, vinyl cyclohexene monoxide and vinyl naphthalene monoxide.

*Example XXXIV*

Compounds having the structure as shown in group (2) above are obtained by reacting the ketimine from diethylene triamine and formaldehyde with each of the following: methyl glycidyl ether, ethyl glycidyl ether, pentyl glycidyl ether, decyl glycidyl ether, cyclohexyl glycidyl ether, cyclohexenyl glycidyl ether, allyl glycidyl ether, phenyl glycidyl ether, chloroallyl glycidyl ether, naphthyl glycidyl ether, allylphenyl glycidyl ether, 2,3-dimethyl butyl glycidyl ether and propinyl glycidyl ether.

Example XXXV

Compounds having the structure as shown in group (3) above are obtained by reacting the ketimine from diethylene triamine and formaldehyde with each of the following: the esters of epoxidized acrylic acid as butyl, ethyl, propyl, eicosanyl, hexadecyl, methylcyclopentyl, phenyl, hydroxyphenyl, allyl and 3,4-diethylhexyl ester.

Example XXXVI

Compounds having the structure as shown in group (4) are obtained by reacting the ketimine from diethylene triamine and formaldehyde with each of the following: glycidyl ester of the following acids, acetic acid, butyric acid, 1-butenoic acid, 1-hexenoic acid, cyclohexanoic acid, methyl cyclopentanoic acid, benzoic acid, butylbenzoic acid and 3,4-dibutylpentylcarboxylic acid.

Example XXXVII

Compounds having the structure shown in group (5) above are prepared by reacting the ketimine from diethylene triamine and formaldehyde with each of the following: the glycidyl propyl diether of 1,6-hexanediol, glycidyl octyl ether of 1,6-hexanediol, glycidyl hexyl diether of 1,6-hexanediol, glycidyl pentenyl diether of 1,6-hexanediol, glycidyl hexenyl diether of 1,6-hexanediol, glycidyl octenyl diether of 1,6-hexanediol, glycidyl octadecenyl diether of 1,6-hexanediol, glycidyl cyclohexyl diether of 1,6-hexanediol, glycidyl phenyl diether of 1,6-hexanediol, glycidyl chloronaphthyl diether of 1,6-hexanediol, glycidyl 3,5-diethylhexyl of diether 1,6-hexanediol.

Example XXXVIII

Compounds having the structure shown in group (6) above are prepared by reacting the ketimine from diethylene triamine and formaldehyde with each of the following: glycidyl propyl ester of succinic acid, glycidyl octyl diester of succinic acid, glycidyl hexyl diester of succinic acid, glycidyl pentenyl diester of succinic acid, glycidyl hexenyl diester of succinic acid, glycidyl octenyl diester of succinic acid, glycidyl octadecenyl diester of succinic acid, glycidyl cyclohexyl diester of succinic acid, glycidyl phenyl diester of succinic acid, glycidyl chloronaphthyl ester of succinic acid, and glycidyl 3,5-diethylhexyl diester of succinic acid.

Example XXXIX

Compounds of groups 7 and 8 shown above are prepared as in Example XXXIII and Example XXXIV with the exception that the formaldehyde is replaced by methyl butyl ketone.

Example XL

Compounds of group (9) shown above are prepared as in Example XXXV by replacing the formaldehyde with butyl hexyl ketone.

Example XLI

Compounds of group 10 are prepared as in Example XXXVI by replacing the formaldehyde with a mixture of phenyl allyl ketone and hexyl vinyl ketone.

Example XLII

Compounds of group (11) are prepared by replacing the formaldehyde in Example XXXVII with a mixture of didecyl ketone and methyl ethyl ketone.

Example XLIII

Compounds of group (12) are prepared by replacing the formaldehyde in Example XXXVIII with a mixture of pentyl bromohexyl ketone and phenylethyl vinyl ketone.

Example XLIV

The compounds of Examples XXXII to XLIII are combined with glycidyl polyether of 2,2-bis(4-hydroxy phenyl) propane in equivalent amounts and the mixture cured at 25° C. and 50% humidity to hard clear insoluble plastic products.

I claim as my invention:

1. A compound of the formula:

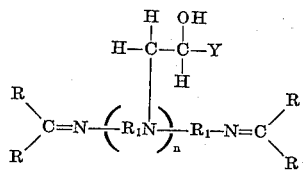

wherein Y is a member of the group consisting of: hydrogen; OH; hydrocarbon radicals; —(CH$_2$)$_x$OR$_2$ radicals wherein R$_2$ is a hydrocarbon, halosubstituted hydrocarbon, hydroxyl-substituted hydrocarbon radical or

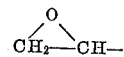

substituted hydrocarbon and $x$ is 0 to 6;

—(CH$_2$)$_x$OR$_1$OR$_2$ wherein R$_2$ and $x$ are as described above;

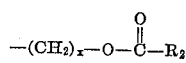

wherein R$_2$ and $x$ are as described above;

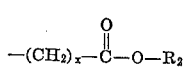

wherein R$_2$ and $x$ are as described above;

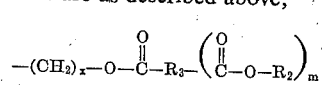

wherein $m$ is an integer of 1 to 3, R$_2$ and $x$ are as described above and R$_3$ is a polyvalent hydrocarbon radical; R is a member of the group consisting of hydrogen and hydrocarbon radicals; R$_1$ is a bivalent hydrocarbon radical; and $n$ is an integer of 1 to 6.

2. A compound as in claim 1 wherein the hydrocarbon and substituted hydrocarbon radicals contain from 1 to 10 carbon atoms.

3. A compound of the formula:

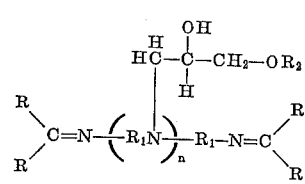

wherein R$_2$ is a hydrocarbon radical containing 1 to 10 carbon atoms, R is a member of the group consisting of hydrogen and hydrocarbon radicals, R$_1$ is a bivalent hydrocarbon radical, and $n$ is an integer of 1 to 6.

4. A compound of the formula:

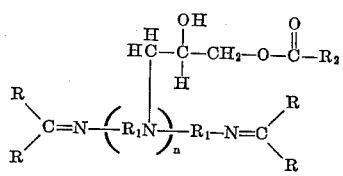

wherein R$_2$ is a hydrocarbon radical containing 1 to 10 carbon atoms, R is a member of the group consisting of hydrogen and hydrocarbon radicals, R$_1$ is a bivalent hydrocarbon radical, and $n$ is an integer of 1 to 6.

5. A compound of the formula:

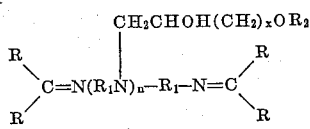

wherein $R_2$ is a hydrocarbon radical containing 1 to 10 carbon atoms, $x$ is 0 to 6, R is an alkyl radical containing from 1 to 6 carbon atoms, $R_1$ is a bivalent aromatic hydrocarbon radical and $n$ is an integer of 1 to 6.

6. A compound of the formula:

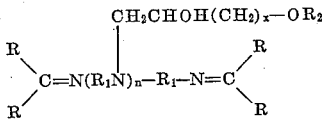

wherein $R_2$ is a halogen-substituted hydrocarbon containing 1 to 10 carbon atoms, $x$ is 0 to 6, R is an alkyl radical containing from 1 to 6 carbon atoms, $R_1$ is a bivalent hydrocarbon radical and $n$ is an integer of 1 to 6.

7. A compound of the formula:

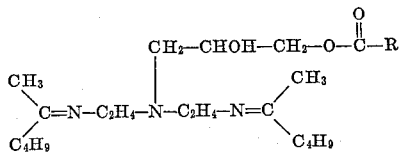

wherein R is an alkyl radical containing from 1 to 10 carbon atoms.

8. A compound of the formula:

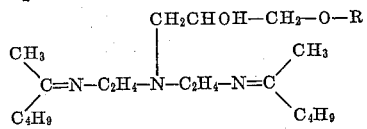

wherein R is a member of the group consisting of aliphatic, cycloaliphatic and aromatic hydrocarbon radicals containing from 1 to 10 carbon atoms.

9. A compound as in claim 8 wherein R is a phenyl radical.

10. A compound of the formula:

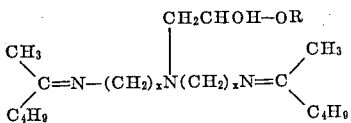

wherein R is a hydrocarbon radical and $x$ is an integer of 1 to 6.

11. A compound of the formula:

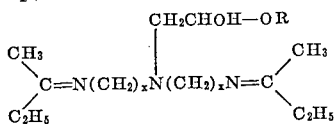

wherein R is a hydrocarbon radical and $x$ is an integer of 1 to 6.

12. A compound of the formula:

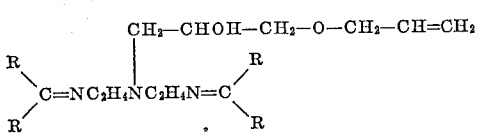

wherein R is an alkyl radical containing from 1 to 10 carbon atoms.

13.

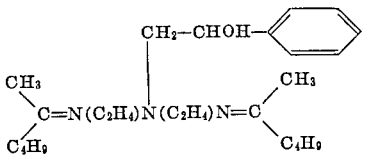

No references cited.

CHARLES B. PARKER, *Primary Examiner.*

ANTON H. SUTTO, *Assistant Examiner.*